United States Patent
Frey et al.

[15] 3,659,381
[45] May 2, 1972

[54] VENT WINDOW SYSTEM FOR VEHICLE BODY STRUCTURE

[72] Inventors: Stuart M. Frey, Birmingham; Harold C. Gebhard, Livonia; Julius Rado, Birmingham, all of Mich.

[73] Assignee: Ford Motor Company, Dearborn, Mich.

[22] Filed: Sept. 25, 1970

[21] Appl. No.: 75,392

[52] U.S. Cl. .................................. 49/103, 49/227, 49/349
[51] Int. Cl. ................................................... E05f 5/10
[58] Field of Search ................... 49/103, 374, 227, 348-351

[56] References Cited

UNITED STATES PATENTS 2,955,817   10/1960   Campbell et al .......................... 49/103

*Primary Examiner*—Kenneth Downey
*Attorney*—John R. Faulkner and John J. Roethel

[57] ABSTRACT

A vehicle body structure having a window opening fitted with a window panel divided vertically into two sections, one of which is substantially smaller than the other. A single window regulator mechanism, which may be manually or power operated, raises and lowers both panel sections in controlled sequence. With the window panel in raised condition, actuation of the window regulator mechanism results in the smaller panel section being lowered into the body structure to provide a ventilation exhaust opening. During the travel of the smaller panel section into the body structure, the larger panel section remains locked in a fully raised position by a latch mechanism that is a component of the window regulator mechanism. When the smaller panel section reaches a predetermined down position, the latch mechanism is released allowing the larger panel section to travel to a full down position. Upon movement of the window panel section from its lowered position to a raised position, a reverse sequence occurs during which the larger panel section again becomes locked in a fully raised position as the smaller panel section continues to move out of the body structure into fully raised position.

16 Claims, 4 Drawing Figures

INVENTORS
Stuart M. Frey
Harold C. Gebhard
Julius Rado
BY John R. Faulkner
John J. Roethel
ATTORNEYS

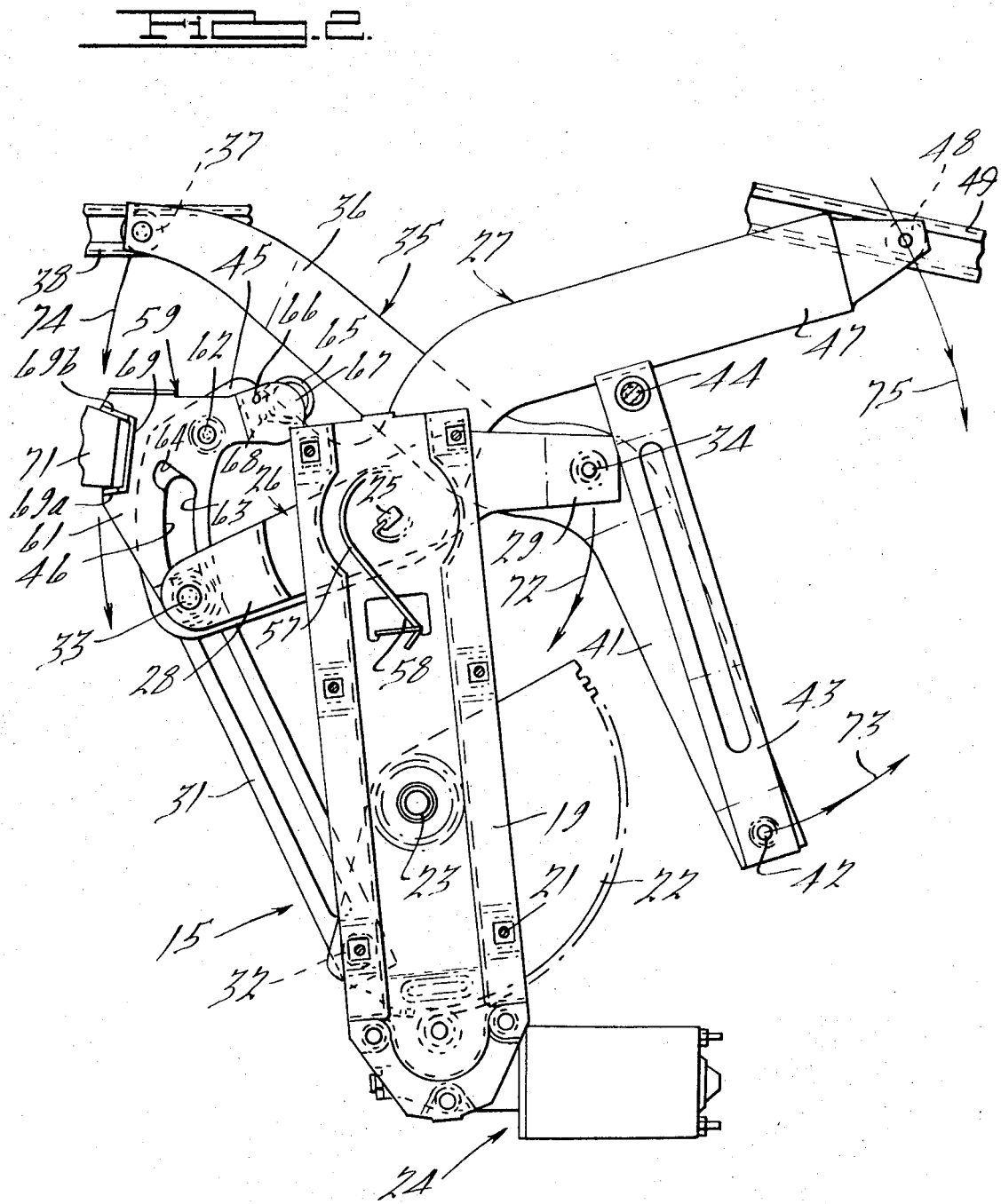

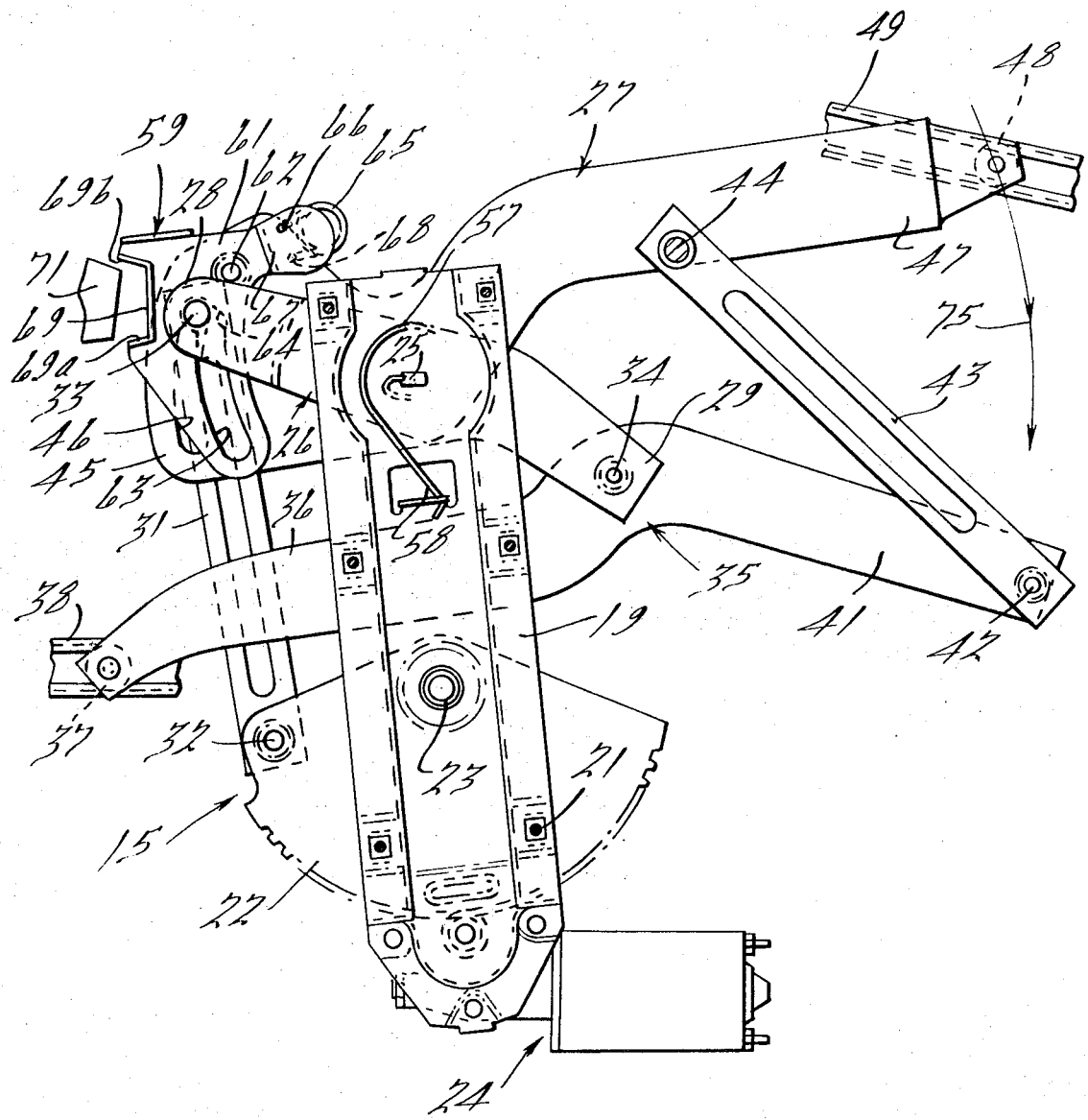

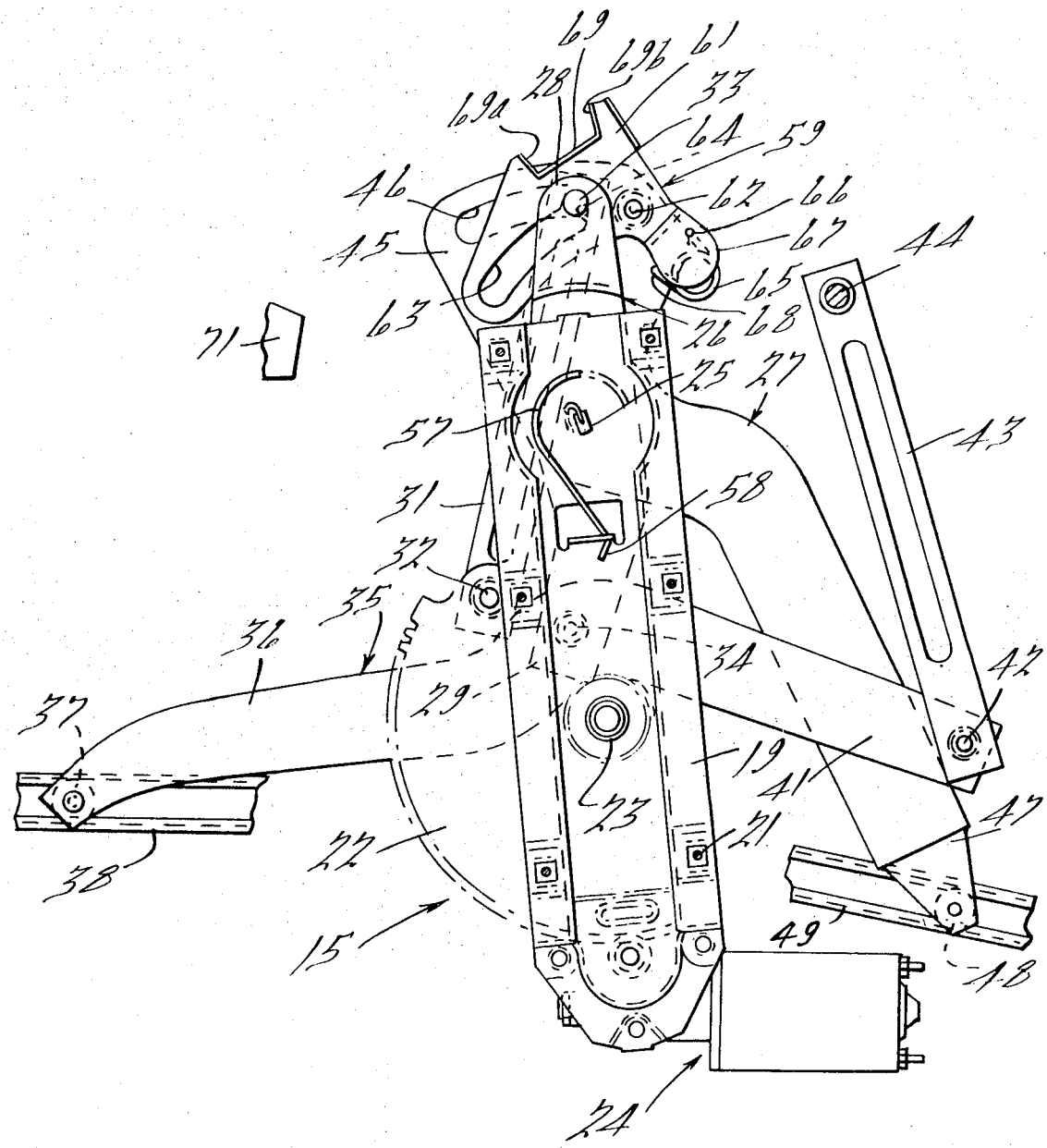

VENT WINDOW SYSTEM FOR VEHICLE BODY STRUCTURE

BACKGROUND OF THE INVENTION

For about 30 years starting in the mid 1930's the front doors of almost all vehicle bodies were equipped with a ventilation window pivotable about a substantially vertical axis and a conventional main window that could be raised and lowered relative to the window opening. With the advent of wrap around windshields and windshields having a greater rearward inclination, the pivoted vent window fell somewhat in disfavor. It was difficult to hinge the sharply triangulated piece of glass that had to be used. The pivoted vent window also required an upstanding frame structure on the door and this created a conflict with the desire to use frameless windows, particularly in the hardtop models. As a result, the pivoted vent window was eliminated in many models and the front door window became a large frameless piece of glass. The elimination of the pivoted vent window has been found not to be wholly acceptable. The vent window provided a desirable exhaust flow of air from the vehicle interior that has not been duplicated by other systems.

As discussed in U.S. Pat. No. 1,770,747 issued July 15, 1930 to William D. Crowell, the area immediately to the rear of the vehicle windshield pillar is a low pressure area when the vehicle is moving. An opening in this area provides an efficient means for exhausting air from the vehicle interior. The Crowell patent discloses a vertical division of the window panel into independently movable sections so that the forward section can be raised or lowered to provide the desired amount of exhaust opening. In the Crowell disclosure, each window panel section is operated by an independent window regulator mechanism and each panel section is guided within fixed guide bars including a fixed division bar between the two sections.

It is an object of the present invention to provide a frameless window vertically divided into a small ventilation section and a large visibility section, the sections being raised and lowered by a single window regulator mechanism constructed and arranged to provide for movement of the ventilation section to a full open position without corresponding movement of the visibility section. Further operation of the mechanism results in movement of the visibility section from a fully raised to a fully lowered or any intermediate position therebetween.

It is a further object to provide a structure in which movement of the ventilation section is guided in part on a guiding and sealing member secured to the front edge of the visibility section. When the visibility section is lowered the entire window opening is unobstructed since the guiding and sealing member is carried into the window well with the glass.

SUMMARY OF THE INVENTION

This invention is concerned with the relationship of a vehicle body having a window opening, a window panel vertically divided into a ventilation section and a visibility section and a window regulator mechanism for sequentially vertically raising and lowering the window panel sections into and out of the window opening. The window regulator mechanism basically comprises a pair of drive arm means each coupled to a window panel section. A drive means coupled to the drive arm means is operable to move the latter sequentially to first lower the ventilation section a predetermined distance independently of the visibility section and then to lower the ventilation and visibility sections together to a fully lowered position of the latter. The window regulator mechanism includes a latch means operable to hold the drive arm means coupled to the visibility section against movement until released by the drive arm means coupled to the ventilation section upon the latter being lowered the predetermined distance. The sequence of movement of the ventilation and visibility sections is reversed upon the latch means becoming operative to hold the visibility panel against movement beyond its fully raised section as the ventilation section continues its upward movement. In the preferred form of the mechanism, the drive means comprises a gear sector and a drive link coupled thereto, the drive link being pivotally connected to the drive arm means coupled to the ventilation section and having a lost motion connection with the drive arm means coupled to the visibility section.

Also, in the preferred form of the mechanism, the drive arm means coupled to the ventilation section comprises a drive arm pivotally supported intermediate its ends on a vehicle body structural member. A support arm is pivotally supported intermediate its ends on one end of the drive arm. A control link is pivotally anchored at one end to the vehicle body structural member and at its other end to one end of the support arm. The other end of the support arm is coupled to the ventilation section.

The geometrical relationship of the drive arm, the support arm and control link are such that upon the window regulator mechanism being actuated to lower the window panel the point of connection of the end of the support arm to the ventilation section moves downward in a substantially vertical direction through the predetermined distance in which the ventilation section moves independently of the visibility section and thereafter moves in a downwardly curved lateral path permitting the visibility section to overtake and move past the ventilation section to a fully lowered position.

DESCRIPTION OF THE DRAWING

Other objects, advantages and features of the present invention will become more apparent as this description proceeds, reference being had to the accompanying drawings wherein:

FIG. 2 is a fragmentary plan view illustrating the window regulator mechanism in window panel raised position;

FIG. 3 is a plan view of the window regulator mechanism illustrating the parts thereof in the relationship in which the ventilation section of the window panel has been lowered and the visibility section has been released from the latch mechanism holding it against downward movement; and FIG. 4 is a plan view of the parts of the window regulator mechanism when both the ventilation and visibility sections are in their lowermost position within the vehicle body structure.

DETAILED DESCRIPTION OF THE INVENTION

Figure 1:
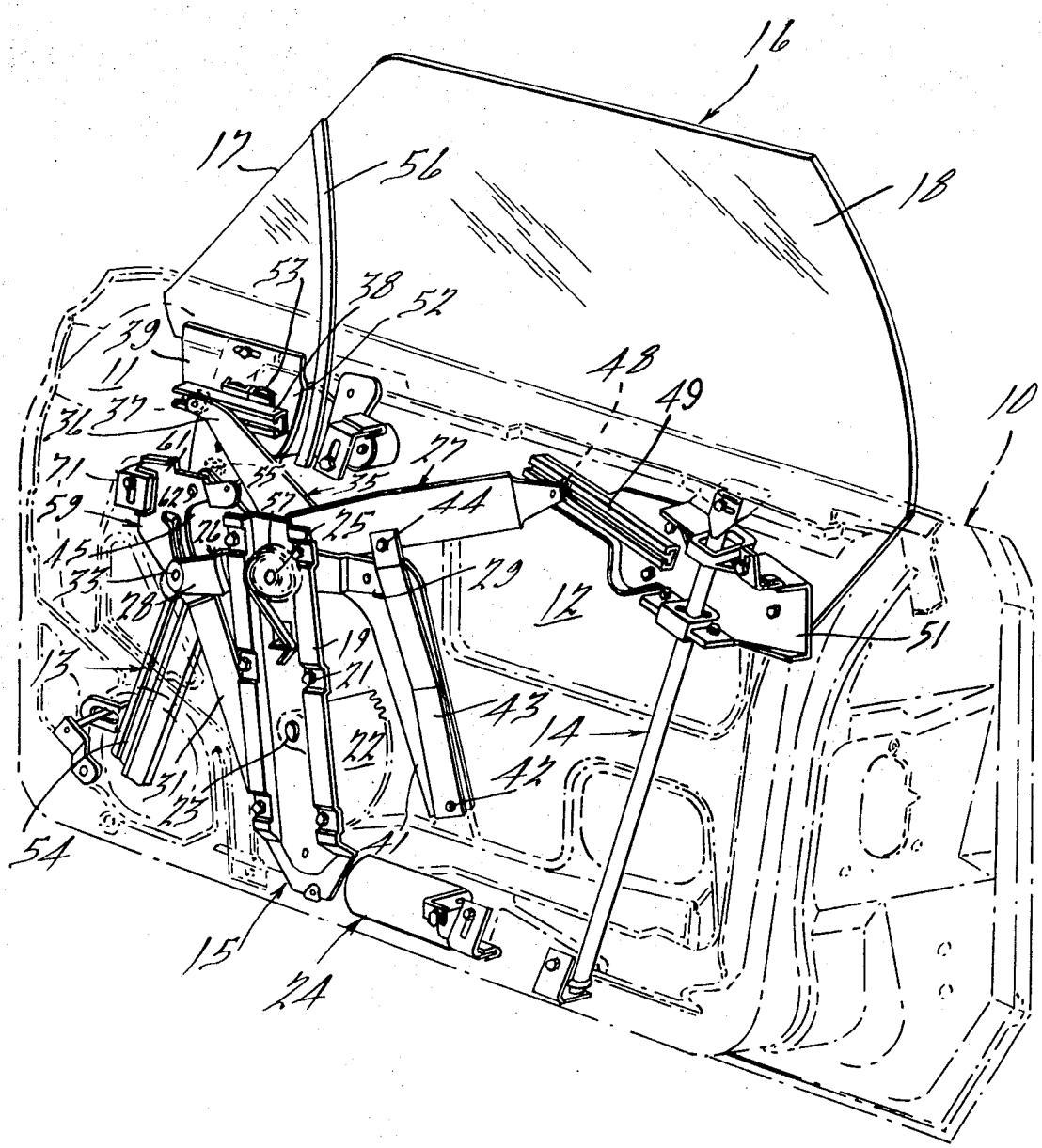
FIG. 1 is a fragmentary perspective view of a vehicle body structure, such as a vehicle door having a sectional window panel mounted therein adapted to be raised and lowered by a window regulator mechanism embodying the present invention.

Referring now to the drawings, there is illustrated in dot and dash outline a portion of a vehicle body structure such as a door, generally designated 10. The door has inner and outer panels 11 and 12, respectively, between and on which the various mechanical hardware items such as a latch mechanism and hinges, none of which is shown, a window guide assembly 13, a door glass run and bracket assembly 14, and a window regulator mechanism generally designated 15 embodying the present invention are mounted.

The window panel, generally designated 16, is vertically divided into at least two sections, a small front ventilation section 17 and a much larger main or visibility section 18.

As in a conventional vehicle installation, window panel 16 is adapted to be raised and lowered relative to a window well in the vehicle body structure or door 10. In accordance with the present invention, the window regulator mechanism 15 is constructed and arranged to lower and raise the window panel sections 17 and 18 in sequential movement, as will be more fully explained.

The window regulator mechanism 15 comprises a vertically elongated base or mounting plate 19 adapted to be mounted as by bolts 21 to the inner door panel 11. A gear sector 22 is rotatably journalled on a flat head shoulder rivet 23 positioned on the lower half section of the plate 19. The gear sector 22 is illustrated as being drivable in window raising or lowering directions by a electric motor and reduction gear unit 24. This is a conventional power operated window regulator mechanism drive unit and a detailed description is not considered necessary. It should also be understood that the gear sector 22 could be rotated by a conventional hand crank driven pinion.

Subjacent its upper end the mounting plate 19 carries a pivot shaft 25 on which are journalled a pair of drive arms 26 and 27, respectively. The pivot axis of the pivot shaft 25 is parallel to the pivot axis defined by the shoulder rivet 23 about which the gear sector 22 rotates.

The drive arm 26 is considered the main or first drive arm and is pivotally mounted intermediate its ends on the pivot shaft 25. It has arm sections 28 and 29 each of which projects laterally of the mounting plate 19 in a generally horizontal direction in window raised position, see FIG. 2.

The gear sector 22 is drivingly connected to the first drive arm 25 by a link 31. The link 31 extends between shoulder rivet 32 located at one corner of the gear sector 22 and a pivot stud 33 carried on the end 28 of the first drive arm 26. The connection of the link 31 to the drive arm end 28 is considered a direct connection in that there is no relative movement between the two other than pivotal movement. The reason for this distinction will become apparent.

At its end 29 the first drive arm 25 carried a shoulder rivet 34 on which an irregularly shaped arm 35 is pivotally supported intermediate its ends. This arm 35 may hereinafter be referred to as the ventilation panel section support arm. The support arm 35 has an S-shaped upper section 36 which in window panel raised position extends at an upwardly inclined angle across the top of mounting plate 19. At its terminal end the upper arm section 36 carries a roller device 37 which is adapted to be coupled to a channel 38 carried on a bracket 39 attached to the lower edge of the ventilation section 17 of the window panel 16.

The end section 41 opposite the S-shaped section 36 of the support arm 35 is relatively straight and at its terminal end carries a shoulder rivet 42. The shoulder rivet 42 pivotally connects the lower end of the control link 43 to the end section 41 of the support arm 35. The control link 43 is pivotally anchored at its upper end to the body structure inner panel 11 by a shoulder rivet 44.

Before describing the manner in which the above-recited arms and links function to raise and lower the ventilation section 17, the components of the window regulator mechanism for raising and lowering the large or visibility panel section 18 will be described. This involves the second drive arm 27 which, as noted, is also pivotally mounted on the mounting plate 19 on pivot shaft 25 with the drive arm 26.

The arm 27 also is pivoted intermediate its ends. On one side of the pivot axis, the left side is viewed in FIG. 2, the arm has a short but wide end section 45 having an arcuate slot 46 the center of curvature of which is the pivot axis of center of the pivot shaft 25. The pivot stud 33 which directly connects the link 31 to the end 28 of the first drive arm 26 passes through the arcuate slot 46 thereby making an indirect or lost motion connection between the link 31 and the arm 27, for a purpose to be hereinafter explained. At its other end 47, the arm 27 carries a roller 48 which is engaged with and travels in a channel 49 carried on a bracket 51 secured to the lower edge of the large or visibility panel section 18. The bracket 51 is a part of a door glass run and bracket assembly 14 which guides the rear portion of the window panel 16 as it is raised and lowered between the inner and outer body structure or door panels 11 and 12. The details of construction of the door glass run and bracket assembly form no part of the present invention.

The front portion of the window panel section 18 also has a bracket 52 attached thereto which carries rollers 53 that engage the window guide assembly 13. The window guide assembly 13 also has a track 54 which is engaged by rollers 55 carried on the bracket 39 secured to the ventilation section 17. The ventilation section 17 is also guided in its up and down movements relative to the visibility section 18 by a sealing channel 56 secured to the front edge of the visibility section 18.

The second drive arm 27 carries the weight of the larger or visibility panel section 18. It is non-rotatably connected to the pivot shaft 25 and the latter is coupled to a flat spiral spring 57 the free end 58 of which is anchored to the mounting plate 19. As in conventional window regulator mechanism practice, the spiral spring 57 is wound up as the arm 27 swings in window lowering direction and functions as a counterbalance to assist in raising the window from its lowered position to its uppermost position.

Because of the lost-motion connection between the second drive arm 27 and the drive link 31, it is necessary to provide a latch device, generally designated 59, to hold the second drive arm against movement when the pivot stud 33 coupling the link 31 to the first drive arm 26 is in a position intermediate the ends of the arcuate slot 46, as will become apparent as the operation of the mechanism is described.

The latch device 59 comprises a thin sheet metal member or latch plate 61. Near its upper edge the latch plate 61 is pivotally mounted on a pivot stud 62 carried on the end section 45 of the second drive arm 27. The latch plate 61 is provided with an arcuate slot 63 complementary to the slot 46 in the end section 45 of the arm 27. The arcuate slot 63 at its upper end has an offset 64 which when the pivot stud 33 is in alignment therewith permits the latch plate 61 to pivot in a counterclockwise direction about the pivot stud 62, as viewed in the drawings. The latch device is urged in this counterclockwise direction by a spring 65 one end 66 of which is hooked into an extension 67 of the body portion 61 and the other end 68 of which is hooked into an aperture in the end section 45 of the arm 27. In the FIG. 2 position the spring ends are close together or in compression, so as to urge the latch device in the counterclockwise direction.

At its left edge, as viewed in the drawings, the latch plate 61 has a flanged indentation 69 which forms a pocket adapted to encompass a catch 71 secured to the inner panel 11 of the vehicle body structure or door, as shown in FIG. 2. With the catch 71 seated in the indentation 69 and with the pivot stud 33 at the lower end of the arcuate slot 63 the arm 27 is held against movement in either an up or a down direction.

OPERATION

Referring now to FIGS. 1 and 2, the window panel 16 in its entirety is shown in a raised position relative to the vehicle body or door structure 10. That is, both the ventilation or small panel section 17 and the visibility or large panel section 18 are in their raised position and the related drive arms of the window regulator mechanism are in corresponding positions.

If it is now desired to provide exhaust ventilation through the ventilation panel 17, this can be accomplished by actuating the electric motor and reduction gear unit 24 to drive the gear sector 22 in a clockwise direction as viewed in the drawings. Clockwise movement of the gear sector 22 results in the link 31 being driven upwardly. Since the link 31 is directly coupled to the end 28 of the drive arm 26, a clockwise swinging movement is imparted to the arm 26 causing the end 29 of the latter, and particularly the pivot or shoulder rivet 34 carried thereon, to be swung in a downward circular path indicated by the line 72 in FIG. 2 about the axis of rotation of the arm 26 as defined by the pivot shaft 25.

The ventilation section support arm 35 which is pivotally connected to the drive arm 26 by the shoulder rivet 34 is carried bodily downwardly around the pivot shaft 25 axis. The lower end 41 of the support arm 35 has been described as being pivotally connected at 42 to the lower end of a control link 43 which is pivotally anchored at its upper end to the inner panel by a shoulder rivet 44. As the support arm 35 is carried bodily downwardly, the pivot stud 42 is forced by the control link 43 to follow a circular path, as indicated by the line 73 in FIG. 2, about the center of the shoulder rivet 44 and the arm 35 is caused to swing in counterclockwise direction about the shoulder rivet 34 on the end of the drive arm 26.

The foregoing geometrical relationship of the drive arm 26, the support arm 35 and the control link 43 results in the roller 37 following a substantially vertical downward path, as indicated by the line 74. Any lateral movement of the roller 37 is accommodated by the channel 38 carried on the bracket 39 attached to the lower edge of the ventilation section 17. This downward movement of the ventilation section 17 is timed to continue until the ventilation section is below the belt line of the vehicle body structure, i.e., until it is in a fully opened position. It will be understood that the downward movement of the ventilation section 17 can be interrupted merely by releasing the switch causing operation of the motor 24.

Because of the lost motion or pin 33 in slot 46 connection between the link 31 and the second drive arm 27, no movement of the gear sector 22 is transmitted to the second drive arm 27. The pivot stud 33, however, has moved away from the bottom of the slot 46 and there would be nothing except the friction in this system and whatever preload had been wound into the spring 57 to resist downward movement of the large or visibility panel 18 without the presence of the latch device 59. As seen in FIGS. 1 and 2, the latch device 59 indentation 69 straddles the catch 71.

The latched condition of the drive arm 27 continues until the pivot stud 33 reaches the top of the slot 46 and the top of the complementary slot 63 in the latch device body portion 61. At this point the pivot 33 becomes aligned with the lateral offset 64 at the end of slot 63 and the spring 65 becomes operative to pivot the latch 59 about the pivot stud 62 to the position shown in FIG. 3. In this position, the lower edge 69a of the latch plate indentation 69 is moved out of the path of the catch 71 and the second drive arm 27 is released for swinging movement in a clockwise direction.

Thus, if rotation of the gear sector 22 in a clockwise direction is continued beyond the point at which the ventilation section 17 is dropped below the belt line of the vehicle door, the continued upward movement of the link 31 will cause the pivot stud 33 on the end thereof to abut the upper end of the slot 46 in the second drive arm 27 causing the latter to be swung in a clockwise direction about the pivot axis defined by the pivot shaft 25. This will result in downward movement of the roller 48 carried on the end 47 of the second drive arm 27, the roller 48 moving in a path indicated by the line 75, see FIG. 3. Downward movement of the roller 48 causes downward movement of the visibility section 18 of the window panel 16 along the door glass run and bracket assembly 14. Lateral movement of the roller 48 is accommodated by the channel 49 on the bracket 51 secured to the lower edge of the window panel section 18.

As the link 31 picks up and drives the second drive arm 27 in a clockwise direction it also continues to drive the first drive arm 26 in a clockwise direction. At this point, however, a radical change in movement of the support arm 35 occurs. Control link 43 which has been swinging in a counterclockwise direction reverses its direction of movement and begins to swing back in a clockwise direction towards its original position shown in FIG. 2. The shoulder rivet 34, however, continues to swing in a circular path indicated by the line 72 and carries the support arm 35 in a lateral direction beneath the pivot axis 25 of the drive arm 26. The result is that the roller 37, while continuing to move in a downward path, also begins to move much more rapidly in a lateral direction away from the regulator mounting plate 19 until it bottoms out and then begins to move in a slightly upward direction. Meanwhile, the roller 48 coupling the second drive arm 27 to the channel 49 attached to the visibility section of the window panel 16 moves downwardly and overtakes the roller 37. Downward movement of the roller 48 continues until the large or visibility section 18 of the window panel 16 is dropped below the belt line out of view within the body structure. As will be understood, suitable stops are provided in the body structure to limit the downward movement of the window panel 16.

To raise the window panel 16 and both of its sections 17 and 18 it is necessary to actuate the drive motor unit 24 to rotate the gear sector 22 in a counterclockwise direction. With the gear sector 22 rotating in a counterclockwise direction, the link 31 is pulled downwardly causing the drive arms 26 and 27 to be swung in counterclockwise direction. The drive arm 26 is swung in a counterclockwise direction because it is coupled directly to the link 31 by the pivot stud 33. The drive arm 27 is swung in a counterclockwise direction because the pivot stud 33 is seated in the laterally offset portion 64 of the slot of the latch device 59 and is thereby blocked against movement in the arcuate slot 46 of the drive arm 27. The roller 48 on the end of the arm section 47 of the second drive arm 27 drives the visibility section 18 of the window panel 16 upwardly. At the same time the roller 37 on the end of the support arm 35 which is pivotally supported on the drive arm 26 retraces its curved path in which the roller 37 actually moves slightly below its position shown in FIG. 4 until it begins to move upwardly until the FIG. 3 section is reached. With the parts as shown in FIG. 3, the visibility section 18 is in a fully raised position but the ventilation section 17 is still below the belt line of the vehicle.

As seen in FIG. 3, the upper edge 69b of the latch plate indentation 69 is in a position to abut the upper surface of the catch 71 and as soon as it does so it overcomes the resistance of the spring 65 and causes the latch plate 61 to rotate in a clockwise direction about pivot stud 62. The second drive arm 27 is then latched against movement in either up or down direction. The slots 63 and 46 assume the complementary relationship shown in FIG. 2. As the link 31 continues its downward movement the pivot pin 33 is free to move downwardly in the slots 46 and 63. As it does so, it transmits movement of the link 31 only to the drive arm 26 causing the latter, the support arm 35 and the control link 43 to be restored toward their FIG. 2 position. As these arms and links move from the FIG. 3 to the FIG. 2 position, the ventilation window 17 moves from below the belt line of the vehicle body structure into the window opening toward the fully closed position shown in FIG. 1.

As was noted above, downward movement of the window panel and its respective sections 17 and 18 can be interrupted at any time so that the ventilation section 17 may be partially opened or fully opened and the visibility section 18, after the ventilation section has been fully opened, may also be placed in a position in which it is partially opened or fully opened. Conversely, during raising movement of the panel 16 the operation may be interrupted at any time so that the visibility section 18 may be partially closed or fully closed and subsequently, after the visibility section is fully closed, the ventilation section 17 may be moved to a partially or fully closed position.

It is to be understood that this invention is not limited to the exact construction illustrated and described above, but that various changes and modifications may be made without departing from the spirit and scope of the invention as defined in the appended claims.

We claim:

1. A vehicle body structure having a window opening,
a window panel vertically divided into a ventilation section and a visibility section,
and a window regulator mechanism for vertically raising and lowering the window panel sections into and out of the window opening,
the window regulator mechanism comprising a first drive arm means coupled to the ventilation section and a second drive arm means coupled to the visibility section,
operating means coupled to the first and second drive arm means operable to move the latter sequentially to first lower the ventilation section a predetermined distance independently of the visibility section and then upon continued operation to lower the ventilation and visibility sections together to a fully lowered position of the latter,
and latch means holding the second drive arm means coupled to the visibility section against movement until released by the first drive arm means coupled to the ventilation section upon the latter being lowered the predetermined distance, the sequence of movement of the ventilation and visibility sections being reversed upon the window panel being raised from a lowered position with the latch means becoming operative to hold the visibility panel against movement beyond its fully raised position as the ventilation section continues its upward movement.

2. A vehicle body structure according to claim 1, in which:
the ventilation section is guided for vertical movement relative to the visibility section on a guide channel secured to the front edge of the latter section.

3. A vehicle body structure according to claim 1, in which:
the drive arm means are swingable about a common pivot axis in counter directions.

4. A vehicle body structure according to claim 3, in which:
the operating means comprises a gear sector and a drive link coupled thereto,
the drive link being pivotally connected to the drive arm means coupled to the ventilation section and having a lost motion connection with the drive arm means coupled to the visibility section.

5. A vehicle body structure according to claim 4, in which:
the drive arm means coupled to the ventilation section comprises a drive arm pivotally supported intermediate its ends on a vehicle body structural member,
a support arm pivotally supported intermediate its ends on one end of the drive arm,
and a control link pivotally anchored at one end to the vehicle body structural member and at its other end to one end of the support arm,
the other end of the support arm being coupled to the ventilation section,
the geometrical relationship of the drive arm, the support arm and control link being such that upon the window regulator mechanism being actuated to lower the window panel the point of connection of the end of the support arm to the ventilation section moves downward in a substantially vertical direction through the predetermined distance in which the ventilation section moves independently of the visibility section and thereafter moves in a downwardly curved lateral path permitting the visibility section to overtake and move past the ventilation section to a fully lowered position.

6. A vehicle body structure according to claim 1, in which:
the operating means comprises a gear sector and a drive link coupled thereto,
the drive link being pivotally connected to the drive arm means coupled to the ventilation section and having a lost motion connection with the drive arm means coupled to the visibility section.

7. A vehicle body structure according to claim 6, in which:
the drive arm means coupled to the ventilation section comprises a drive arm pivotally supported intermediate its ends on a vehicle body structural member,
a support arm pivotally supported intermediate its ends on one end of the drive arm,
and a control link pivotally anchored at one end to the vehicle body structural member and at its other end to one end of the support arm,
the other end of the support arm being coupled to the ventilation section,
the geometrical relationship of the drive arm, the support arm and control link being such that upon the window regulator mechanism being actuated to lower the window panel the point of connection of the end of the support arm to the ventilation section moves downward in a substantially vertical direction through the predetermined distance in which the ventilation section moves independently of the visibility section and thereafter moves in a downwardly curved lateral path permitting the visibility section to overtake and move past the ventilation section to a fully lowered position.

8. A vehicle body structure according to claim 1, in which:
the drive arm means coupled to the ventilation section comprises a drive arm pivotally supported intermediate its ends on a vehicle body structural member,
a support arm pivotally supported intermediate its ends on one end of the drive arm,
and a control link pivotally anchored at one end to the vehicle body structural member and at its other end to one end of the support arm,
the other end of the support arm being coupled to the ventilation section,
the geometrical relationship of the drive arm, the support arm and control link being such that upon the window regulator mechanism being actuated to lower the window panel the point of connection of the end of the support arm to the ventilation section moves downward in a substantially vertical direction through the predetermined distance in which the ventilation section moves independently of the visibility section and thereafter moves in a downwardly curved lateral path permitting the visibility section to overtake and move past the ventilation section to a fully lowered position.

9. A vehicle body structure having a window opening,
a window panel vertically divided into two sections,
the window panel section toward the front end of the vehicle body structure being substantially smaller than the section rearwardly thereof,
and a window regulator mechanism for raising and lowering the window panel sections into and out of the window opening,
wherein the improvement comprises:
the window regulator mechanism having a pair of pivoted drive arms one of which pivotally carries a support arm coupled to the smaller panel section and the other of which is coupled directly to the larger panel section,
drive means coupled to the drive arms to swing the latter in window panel section raising and lowering direction,
the drive means being directly coupled to the one drive arm and being coupled to the other drive arm through a lost motion connection means whereby upon operation of the drive means to lower the window panel from a raised position the smaller panel section will be lowered a predetermined distance without corresponding movement of the larger panel section until the lost motion is taken up at which time the larger panel section also will be lowered,
the window regulator mechanism including a latch means effective to hold the other of the drive arms and therefore the larger panel section against movement while the smaller panel section moves within the range of the lost motion movement,
the latch means being released by a part of the lost motion connection means as the latter initiates downward movement of the larger panel section,
the sequence of movement of the larger and smaller panel sections being reversed upon the window panel being raised from a lowered position with the latch means becoming operative to hold the other of the drive arms as soon as the larger panel section reaches fully raised position as the one arm continues its movement to raise the smaller panel section to fully raised position.

10. A vehicle body structure according to claim 9, in which:
the pair of pivoted drive arms are swingable about a common pivot axis in counter directions.

11. A vehicle body structure according to claim 10, in which:
the drive means comprises a gear sector and a drive link coupled thereto,
the drive link being a component of the drive means that is directly coupled to the one drive arm carrying the smaller panel section and that has the lost motion connection with the other drive arm coupled to the larger panel section.

12. A vehicle body structure according to claim 11, in which:
the support arm pivotally carried on the one drive arm is swingable about a pivot axis intermediate its ends and is coupled at one end to the smaller panel section, and a control link is pivotally anchored at one end to the vehicle body structure and at its other end to the other end of the support arm, the geometrical relationship of the one drive arm, the support arm and control link being such that upon the window regulator mechanism being actuated to lower the window panel the point of connection of the end of the support arm to the smaller panel section moves downward in a substantially vertical direction through the predetermined distance the smaller panel section moves without corresponding movement of the larger panel section and thereafter moves in a downwardly curved lateral path permitting the larger panel section to overtake and move past the smaller panel section to a fully lowered position.

13. A vehicle body structure according to claim 9, in which:

the drive means comprises a gear sector and a drive link coupled thereto, the drive link being a component of the drive means that is directly coupled to the one drive arm carrying the smaller panel section and that has the lost motion connection with the other drive arm coupled to the larger panel section.

14. A vehicle body structure according to claim 13, in which:

the support arm pivotally carried on the one drive arm is swingable about a pivot axis intermediate its ends and is coupled at one end to the smaller panel section, and a control link is pivotally anchored at one end to the vehicle body structure and at its other end to the other end of the support arm, the geometrical relationship of the one drive arm, the support arm and control link being such that upon the window regulator mechanism being actuated to lower the window panel the point of connection of the end of the support arm to the smaller panel section moves downward in a substantially vertical direction through the predetermined distance the smaller panel section moves without corresponding movement of the larger panel section and thereafter moves in a downwardly curved lateral path permitting the larger panel section to overtake and move past the smaller panel section to a fully lowered position.

15. A vehicle body structure according to claim 9, in which:

the support arm pivotally carried on the one drive arm is swingable about a pivot axis intermediate its ends and is coupled at one end to the smaller panel section, and a control link is pivotally anchored at one end to the vehicle body structure and at its other end to the other end of the support arm, the geometrical relationship of the one drive arm, the support arm and control link being such that upon the window regulator mechanism being actuated to lower the window panel the point of connection of the end of the support arm to the smaller panel section moves downward in a substantially vertical direction through the predetermined distance the smaller panel section moves without corresponding movement of the larger panel section and thereafter moves in a downwardly curved lateral path permitting the larger panel section to overtake and move past the smaller panel section to a fully lowered position.

16. A window regulator mechanism for moving a plurisectional window panel into and out of a window opening in a vehicle body structure having a mechanism support panel subjacent the window opening, the window regulator mechanism comprising:

a mounting plate secured to the support panel, a gear sector rotatably supported on the mounting plate, a first drive arm pivotally supported on a mounting plate for pivotal movement about a pivot axis paralleling the pivot axis of the gear sector, the pivot axis of the first drive arm being located intermediate the ends of the latter and each end projecting beyond the mounting plate, a drive link pivotally connected at one end to the gear sector and at its other end to one end of the first drive arm to translate rotational movement of the gear sector into swinging movement of the first drive arm, a first window panel section support arm pivotally mounted intermediate its ends on the other end of the first drive arm, one end of the support arm being adapted to be operatively connected to the first window panel section and the other end being pivotally connected to one end of a control link the other end of which is pivotally connected to the support panel, the geometrical relationship of the gear sector, the first drive arm, the drive link connecting the gear sector to the first drive arm, the first window panel section support arm and the control link being such that rotation of the gear sector from a window panel up position results in downward substantially vertical movement of the window panel connected end to a predetermined point following which the end movement follows a downwardly curved path;

a second drive arm superimposed over the first drive arm for pivotal movement about the pivot axis of the latter, the drive link having at one end a pin and slot connection with the end of the drive link connected to the first drive arm and at its other end being adapted to be operatively connected to a second window panel section, the pin and slot connection between the drive link and the second drive arm preventing translation of gear sector movement to the second drive arm until the substantially vertical downward movement of the end of the support arm connected to the first window panel section reaches the predetermined point at which the end movement begins to follow the curved path, the drive link then picking up the second drive arm and swinging the latter so that its end connected to the second window panel section drives the latter to a lowered position, latch means carried by said second drive arm to hold the latter against movement except through the drive link, the latching action of the latch means being controlled by the pin of the pin and slot connection between the drive link and second drive arm with the latch means being released by the pin as the drive link picks up the second drive arm, and operating means for driving the gear sector in window raising and lowering direction.

* * * * *